(12) United States Patent
Förster et al.

(10) Patent No.: US 12,710,299 B2
(45) Date of Patent: Aug. 18, 2026

(54) METHOD FOR OPERATING A MAGNETIC-INDUCTIVE FLOWMETER AND MAGNETIC-INDUCTIVE FLOWMETER

(71) Applicant: Krohne Messtechnik GmbH, Duisburg (DE)

(72) Inventors: Jan Förster, Essen (DE); Thomas Fritsch, Jüchen (DE); Wacker Paul, Duisburg (DE)

(73) Assignee: Krohne Messtechnik GmbH, Duisburg (DE)

( * ) Notice: Subject to any disclaimer, the term of this patent is extended or adjusted under 35 U.S.C. 154(b) by 267 days.

(21) Appl. No.: 18/598,393

(22) Filed: Mar. 7, 2024

(65) Prior Publication Data

US 2024/0302193 A1 Sep. 12, 2024

(30) Foreign Application Priority Data

Mar. 7, 2023 (DE) ..................... 10 2023 105 640.9

(51) Int. Cl.
*G01F 1/60* (2006.01)
*G01F 1/58* (2006.01)

(52) U.S. Cl.
CPC ................ *G01F 1/60* (2013.01); *G01F 1/588* (2013.01)

(58) Field of Classification Search
None
See application file for complete search history.

(56) References Cited

U.S. PATENT DOCUMENTS 4,402,230 A 9/1983 Raptis
8,046,194 B2 * 10/2011 Rufer ...................... G01F 1/584 73/861.14
12,523,589 B2 * 1/2026 Vaissiere ................ G01N 11/16
2003/0029249 A1 2/2003 Keech
2017/0089743 A1 3/2017 Machuca et al.
2020/0271492 A1 * 8/2020 Schmalzried ........... G01F 1/588

FOREIGN PATENT DOCUMENTS

CN 109781195 A 5/2019
WO 2008/055485 A1 5/2008
WO 2014/209990 A1 12/2014
WO 2015/069249 A1 5/2015

* cited by examiner

*Primary Examiner* — Suman K Nath
(74) *Attorney, Agent, or Firm* — Muncy, Geissler, Olds & Lowe, P.C.

(57) ABSTRACT

A method for operating a magnetic-inductive flowmeter includes: recording an electrode signal of an electrode voltage during a magnetic field alignment as measurement data; low-pass filtering the measurement data so that a first low-pass filtered evaluation signal is present; determining a first flow parameter from the low-pass filtered evaluation signal, which is compared with a first limit value; high-pass filtering the measurement data so that a high-pass filtered evaluation signal is present; determining a second flow parameter from the high-pass filtered evaluation signal, which is compared with a second limit value; separately subjecting the low-pass-filtered evaluation signal and the high-pass-filtered evaluation signal to a same evaluation; and assigning a two-phase flow to the flowing medium if at least one of: (i) the first flow parameter exceeds the first limit value; and (ii) the second flow parameter exceeds the second limit value. A related flowmeter is also disclosed.

18 Claims, 3 Drawing Sheets

METHOD FOR OPERATING A MAGNETIC-INDUCTIVE FLOWMETER AND MAGNETIC-INDUCTIVE FLOWMETER

TECHNICAL FIELD

The invention is based on a method for operating a magnetic-inductive flowmeter, wherein the magnetic-inductive flowmeter comprises at least one measuring tube for guiding a flowing medium, at least one magnetic field generating device for generating a magnetic field passing through the measuring tube perpendicular to the direction of flow of the medium, at least one pair of electrodes for tapping an electrical voltage induced in the medium in the measuring tube, and at least one control and evaluation unit.

In detail, the invention relates to the capture of a two-phase flow of a flowing medium.

In addition, the invention relates to a magnetic-inductive flowmeter, wherein the magnetic-inductive flowmeter comprises at least one measuring tube for guiding a flowing medium, at least one magnetic field generating device for generating a magnetic field passing through the measuring tube perpendicular to the direction of flow of the medium, at least one pair of electrodes for tapping an electrical voltage induced in the medium in the measuring tube, and at least one control and evaluation unit.

BACKGROUND

Magnetic-inductive flowmeters (MIF) are used to determine the flow rate of liquids in a pipeline. With this measuring principle, a magnetic field is applied perpendicular to the direction of flow of the medium in the measuring tube and charge carriers in the medium flowing through the MIF are deflected perpendicular to the direction of flow and perpendicular to the magnetic field by the effect of the Lorenz force. This creates an electrical voltage proportional to the flow velocity, which can be tapped using two measuring electrodes.

For this measuring principle to work, it is generally assumed that the medium flowing through the MIF is electrically conductive. If electrically non-conductive or electrically low-conductive components are present in the medium, these components lead to a change in the electrical voltage between the measuring electrodes and thus to a change in the measured value of the MIF. Such non-conductive or low-conductive components in the medium can be caused by gas inclusions in the liquid medium, for example. Another example of the presence of non-conductive components in the medium is a water-oil mixture.

Such a mixture of electrically conductive and electrically non-conductive components in the medium is usually referred to as a two-phase flow, wherein the two phases represent different influences for the measuring principle. The first phase is formed by the electrically conductive components in the medium and the second phase is formed by the electrically non-conductive components.

The non-conductive components in the medium do not contribute to the electrical voltage between the measuring electrodes, as no free charge carriers can be displaced in these areas by the Lorenz force.

The measured electrical voltage between the measuring electrodes therefore changes due to the presence of a two-phase flow.

It is known from the state of the art to recognize the presence of a two-phase flow by observing the temporal variation of the electrode voltage.

However, this method cannot differentiate between other influences on the standard deviation. If other disturbances, such as turbulence due to unfavorable pipe geometries or unfavorable valve positions, also perform to an increased standard deviation, this method will always indicate a two-phase flow as an error, even if this is not present and the cause is to be sought elsewhere.

A method for operating a magnetic-inductive flowmeter is known from the document EP 2 130 002 B1, wherein the signals from the measuring electrodes of the MIF are transformed from the time range into the frequency range. The flow type is determined taking into account the noise spectrum, for example by determining the spectral power density or by comparison with a reference frequency.

In addition, publication WO 2020/050892 A1 also discloses a method for operating a magnetic-inductive flowmeter, wherein the noise level is used to determine whether the medium to be examined is contaminated.

In detail, the constant component is subtracted in the time range, the signals are then high-pass filtered and then analyzed. The analysis is initially based on determining the standard deviation of these filtered signals and the distance between the maximum and minimum values of these filtered signals. The values determined in this way are then smoothed by median and low-pass filtering and checked for exceeding a limit value. If the limit value is exceeded, two-phase flow is present.

SUMMARY

Based on the prior art described above, the object of the present invention is to provide a method for operating a magnetic-inductive flowmeter which ensures reliable detection of a two-phase flow. Furthermore, the object of the invention is to provide a corresponding magnetic-inductive flowmeter.

According to a first teaching of the present invention, the aforementioned object is achieved by a method as described at the beginning, in that in a recording step, the control and evaluation unit records the electrode signal of the electrode voltage during a magnetic field alignment as measurement data, that the measurement data is filtered through a low-pass filter in a first filter step, so that a first low-pass filtered evaluation signal is present, wherein a first current parameter is determined from the low-pass filtered evaluation signal, which is compared with a first limit value stored in the control and evaluation unit, and that the measurement data is filtered through a high-pass filter in a second filtering step, so that a high-pass filtered evaluation signal is present, wherein a second flow parameter is determined from the high-pass filtered evaluation signal, which is compared with a second limit value stored in the control and evaluation unit, so that the low-pass filtered evaluation signal and the high-pass filtered evaluation signal are subjected separately to the same evaluation, and that in an assignment step, a two-phase flow is assigned to the flowing medium if the first flow parameter exceeds the first limit value and/or if the second flow parameter exceeds the second limit value.

According to the invention, it was recognized that in the presence of a two-phase flow, changes in the electrode signal occur both in the high-frequency range and in the low-frequency range.

Changes in the high-frequency range are mainly present at higher flow velocities and at lower flow velocities changes in the electrode signal at low frequencies dominate.

By filtering the measurement data through a high-pass filter on the one hand and a low-pass filter on the other, the changes in both frequency ranges are determined and assessed separately.

When it is stated that the low-pass filtered evaluation signal is subjected to the same evaluation separately, this means that the evaluation signals are subjected to the same analysis steps. Individual values, for example the first limit value and the second limit value, may well differ.

The method therefore has the advantage that the presence of a two-phase flow can be determined particularly accurately both at high flow velocities and at low flow velocities.

Furthermore, the method has the advantage that the complete evaluation of the measurement data can be carried out in the time range, so that a computationally complex transformation of the measurement data into the frequency range can be omitted.

The limit value stored in the control and evaluation unit delimits the range of the one-phase flow from the range of the two-phase flow. When it is said that a flow parameter is compared with a limit value to determine whether the flow parameter exceeds the limit value, this means that the flow parameter lies within the value range of the two-phase flow if a two-phase flow is present. In other words, it is checked whether an upper limit value is exceeded or a lower limit value is undershot.

According to a particularly preferred design, the variance of the low-pass filtered evaluation signal is determined as the first flow parameter, so that a low-pass variance is present, and the variance of the high-pass filtered evaluation signal is determined as the second flow parameter, so that a high-pass variance is present. According to this embodiment, a low-pass variance limit value and a high-pass variance limit value are stored in the control and evaluation unit, wherein the low-pass variance is compared with the low-pass variance limit value and wherein the high-pass variance is compared with the high-pass variance limit value. A two-phase flow is assigned to the medium if the first low-pass variance exceeds the low-pass variance limit value and/or if the first high-pass variance exceeds the high-pass variance limit value.

This design of the method takes into account that other frequencies and/or frequencies with a higher amplitude are contained in low frequency ranges and/or in high frequency ranges of the measurement data compared to the measurement data of a single-phase flow, so that the variance of the frequency range under consideration increases. As shown above, this applies to both the low frequency range and the high frequency range.

According to one design of the method, the low-pass variance limit and the high-pass variance limit have the same values. For this purpose, the values for the high-pass variance and the values for the low-pass variance are normalized. This design has the advantage that the same limit value for the high-pass variance and the low-pass variance can be selected for different designs of flowmeters, for example with different measuring tube diameters. Alternatively, the low-pass variance limit value and the high-pass variance limit value differ.

According to a next design, the constant component is subtracted from the low-pass filtered evaluation signal before the comparison with the first limit value and the constant component is subtracted from the first high-pass filtered evaluation signal before the comparison with the second limit value.

According to a further preferred design of the method, at least one further electrode signal is captured during at least one further magnetic field alignment and at least one further first flow parameter is determined from the at least one further electrode signal after the low-pass filtering and at least one further second flow parameter is determined from the at least one further electrode signal after the high-pass filtering. The first flow parameters are averaged so that an averaged first flow parameter is present, and the second flow parameters are averaged so that an averaged second flow parameter is present and to detect a two-phase flow, the averaged first flow parameter is compared with the first limit value and the averaged second flow parameter is compared with the second limit value.

According to an alternative design, at least one further electrode signal is captured during at least one further magnetic field alignment so that a plurality of measurement data is available and the plurality of measurement data is averaged so that averaged measurement data is available. The averaged measurement data is then further evaluated by high-pass filtering and low-pass filtering to determine a two-phase flow.

This design of the method also ensures a better signal-to-noise ratio, so that a difference in the variance, i.e. the exceeding of a limit value, can be determined particularly accurately. Preferably, the measurement data from a sequence of magnetic field alignments is compared so that measurement data is captured for a total duration of approx. 5 s.

According to a further preferred design, the cut-off frequency $f_{low}$ of the low-pass filter is between 30 Hz and 500 Hz, wherein the cut-off frequency $f_{low}$ is preferably approx. 100 Hz. This design takes into account that changes in the variance at low frequencies below 150 Hz or below 100 Hz or below 50 Hz are present, especially at slow flow velocities.

If a two-phase flow is present, high changes in the variance in these frequency ranges can also be used as an indicator of a slow flow velocity.

A next design of the method according to the invention is characterized in that the cut-off frequency $f_{high}$ of the high-pass filter is between 500 Hz and 1200 Hz, wherein the cut-off frequency $f_{high}$ is preferably approx. 1000 Hz. This design takes into account that changes in the variance at high frequencies above 900 Hz or 1000 Hz or 1100 Hz are present, particularly at high flow velocities.

If a two-phase flow is present, high changes in the variance at high frequencies can also be used as an indicator of high flow velocities.

According to a further preferred design, if a two-phase flow is determined, the non-conductive portion of the flowing medium is determined based on the first flow parameter or the averaged first flow parameter and/or based on the second flow parameter or the averaged second flow parameter. If the proportion of the non-conductive phase is known, the flow rate of the conductive phase can be determined taking the non-conductive proportion into account.

The magnetic-inductive flowmeter is calibrated for this purpose. In detail, a relationship between the high-pass variance and/or the low-pass variance and the proportion of the non-conductive phase for different flow rates is stored in the control and evaluation unit. This means that the proportion of the non-conductive phase can be determined for a known high-pass variance and/or known low-pass variance and a known flow rate. If both the high-pass variance and the low-pass variance are determined, the proportions of the non-conductive phase determined by means of one variance each serve as control values for each other. A deviation of the proportion of the non-conductive phase determined by means of the high-pass variance from the proportion of the non-conductive phase determined by means of the low-pass variance indicates an error in the calibration and/or in the determination of the high-pass variance and/or the low-pass variance.

According to a further preferred design of the method, a dependency of the first flow parameter and/or the second flow parameter on the flow velocity is stored in the control and evaluation unit and the presence of a two-phase flow is determined based on the course of the first flow parameter or the averaged first flow parameter at different flow velocities of the flowing medium and/or based on the course of the second flow parameter or the averaged second flow parameter at different flow velocities of the flowing medium.

If the flow parameter is the variance of the measured data, the high-pass variance increases with increasing flow velocity and the low-pass variance decreases with increasing flow velocity if the composition of the two-phase flow is constant.

According to one design of the method, the relationship between the high-pass variance and the low-pass variance for different proportions of the non-conductive phase and flow velocity is stored in the control and evaluation unit. If the proportion of the non-conductive phase is known and the high-pass variance and/or the low-pass variance is determined, the flow velocity can be determined. For example, the flow velocity determined in this way can be used as a control value for the flow velocity determined by means of the electrode voltage.

According to a next design of the method, if a two-phase flow is determined, wherein the proportion of the non-conductive phase is determined, the volume flow rate of the conductive phase is determined taking into account the non-conductive phase. This design of the method has the advantage that the volume flow rate of the conductive phase can be determined particularly accurately.

According to a second teaching of the present invention, the object described at the beginning is solved by a magnetic-inductive flowmeter described at the beginning, wherein the magnetic-inductive flowmeter comprises at least one measuring tube for conducting a flowing medium, at least one magnetic field generating device for generating a magnetic field passing through the measuring tube perpendicular to the direction of flow of the medium, at least one pair of electrodes for tapping an electrical voltage induced in the medium in the measuring tube, and at least one control and evaluation unit, characterized in that the control and evaluation unit performs one of the methods described above during operation.

With regard to the advantages of the individual designs of the method, reference is made to the explanations of the respective method.

The magnetic-inductive flowmeter according to the invention thus has the advantage that it ensures reliable detection of a two-phase flow at low and at high flow velocities.

BRIEF DESCRIPTION OF THE DRAWINGS

There are now a large number of possibilities for designing and further developing the method and the flowmeter according to the invention. Reference is made to the embodiments described below in combination with the drawings.

DETAILED DESCRIPTION

Figure 1:
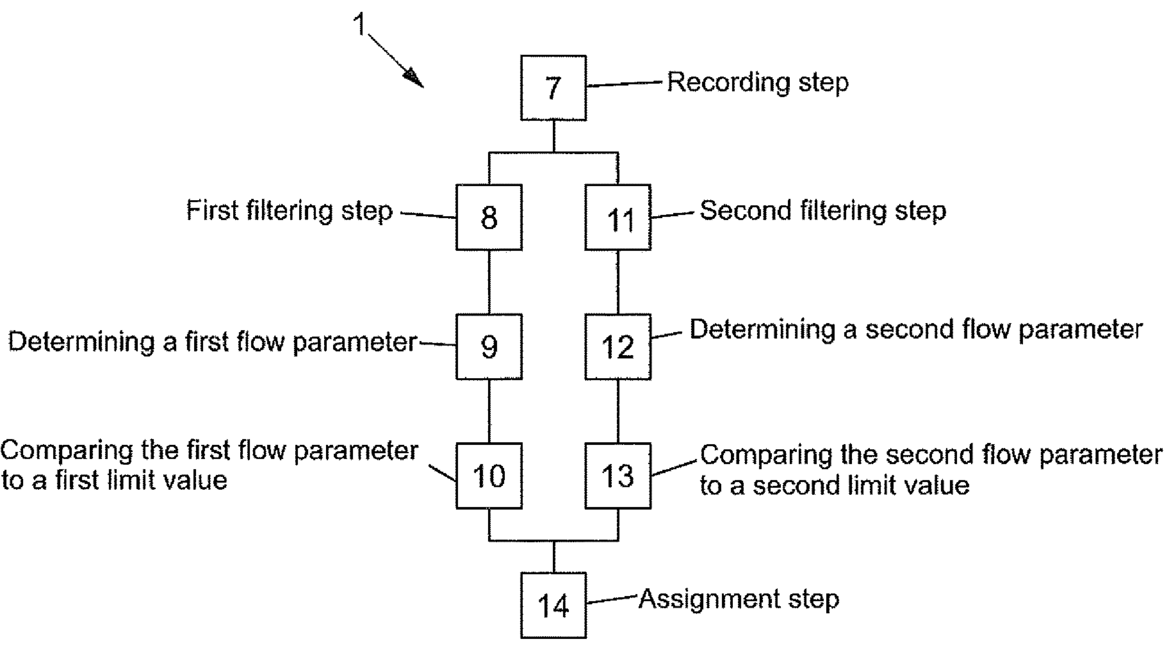
FIG. 1 illustrates a first embodiment of the method for operating a magnetic-inductive flowmeter.

FIG. 1 shows an embodiment of the method 1 according to the invention for operating a magnetic-inductive flowmeter 2, wherein the magnetic-inductive flowmeter 2 comprises a measuring tube 3 for guiding a flowing medium, a magnetic field generating device 4 for generating a magnetic field passing through the measuring tube 3 perpendicular to the direction of flow of the medium, a pair of electrodes 5 for tapping an electrical voltage induced in the medium in the measuring tube 3, and a control and evaluation unit 6.

In detail, the method 1 shown concerns the determination of a two-phase flow of the flowing medium.

For this purpose, the method 1 shown has the following steps:

In a recording step 7, the control and evaluation unit 6 records the electrode signal of the electrode voltage during a magnetic field alignment as measurement data.

The measurement data is then filtered through a low-pass filter in a first filter step 8, so that a first low-pass filtered evaluation signal is available. A first flow parameter is determined from the low-pass filtered evaluation signal 9 and this first flow parameter is compared with a first limit value 10 stored in the control and evaluation unit 6.

In addition, the measurement data is filtered through a high-pass filter in a second filter step 11, so that a high-pass filtered evaluation signal is available. A second flow parameter is determined from the high-pass filtered evaluation signal 12 and this second flow parameter is compared with a second limit value stored in the control and evaluation unit 6 13.

In the embodiment shown, the measurement data is thus evaluated essentially simultaneously on two analysis paths, wherein the measurement data is examined on a first path with regard to changes at high frequencies and wherein the measurement data is examined on a second path with regard to changes at low frequencies.

The low-pass filtered evaluation signal and the high-pass filtered evaluation signal are subjected to the same evaluation separately.

In a next assignment step 14, a two-phase flow is assigned to the flowing medium if the first flow parameter exceeds the first limit value and/or if the second flow parameter exceeds the second limit value.

The method shown thus has the advantage that the presence of a two-phase flow is based on the analysis of the measurement data in different frequency ranges, so that a two-phase flow can be detected at both slow and fast flow velocities.

Figure 2:
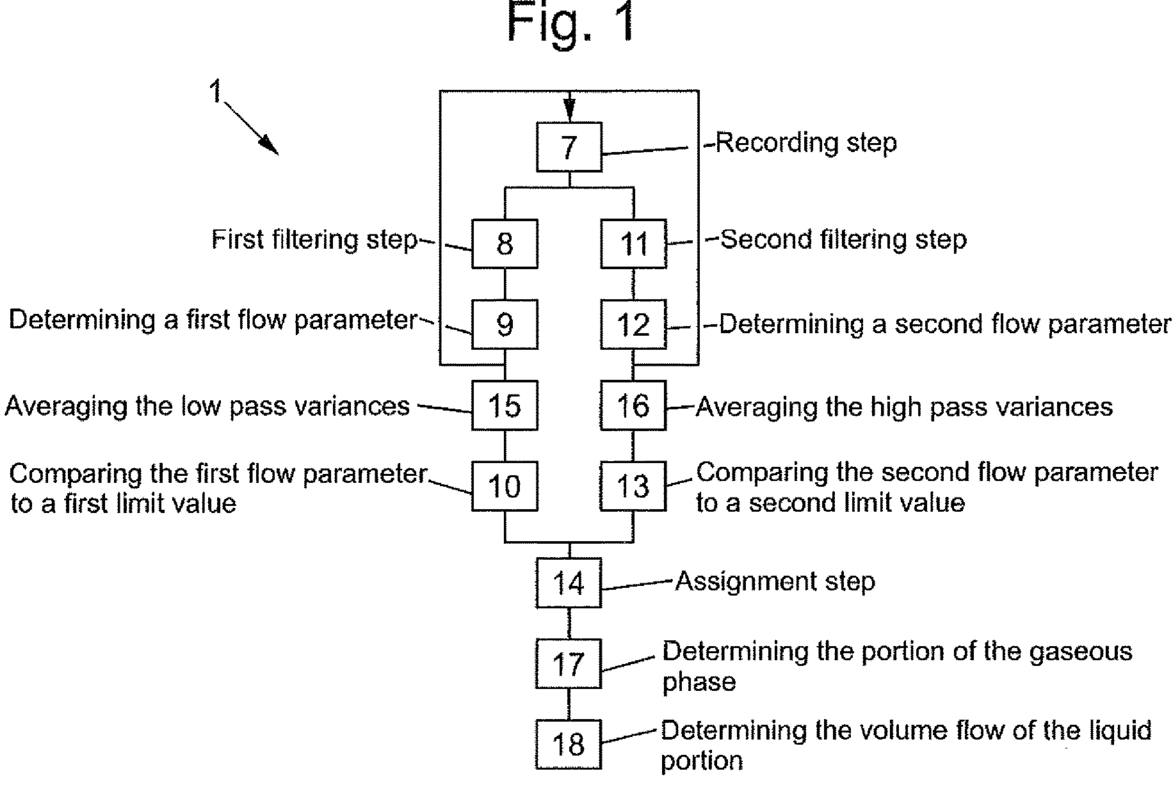
FIG. 2 illustrates a further embodiment of the method for operating a magnetic-inductive flowmeter.

FIG. 2 shows a further embodiment of the method 1 for operating a magnetic-inductive flowmeter 2, wherein the magnetic-inductive flowmeter 2 is designed as described in FIG. 1.

In a recording step 7, the control and evaluation unit records the electrode signal of the electrode voltage during a magnetic field alignment as measurement data.

The measurement data is then filtered through a low-pass filter in a first filter step 8, wherein the variance of the low-pass filtered evaluation signal is determined as the first flow parameter 9, so that a low-pass variance is present.

In addition, the measurement data is filtered through a high-pass filter in a second filter step 11, wherein the variance of the high-pass filtered evaluation signal is determined as the second flow parameter 12, so that a high-pass variance is present.

This step is repeated for a plurality of magnetic field alignments so that a plurality of low-pass variants and a plurality of high-pass variants are present. The plurality of low-pass variances is averaged to an averaged low-pass variance 15 and the plurality of high-pass variances is averaged to an averaged high-pass variance 16.

The averaged low-pass variance is then compared 10 with a low-pass variance limit value stored in the control and evaluation unit 6 and the averaged high-pass variance is compared 13 with a high-pass variance limit value stored in the control and evaluation unit 6.

If the averaged low-pass variance exceeds the low-pass variance limit value and/or if the averaged high-pass variance exceeds the high-pass variance limit value, a two-phase flow is assigned to the medium to be examined in an assignment step 14.

According to the embodiment shown, a relationship between the averaged low-pass variance and the averaged high-pass variance and the proportion of a gas phase in a two-phase flow for different flow velocities is stored in the control and evaluation unit.

If the flow rate is known, the proportion of the gaseous phase is determined according to a next step 17 using the captured averaged low-pass variance and/or the captured averaged high-pass variance.

Based on the proportion of the gaseous phase, the flow rate of the liquid phase is determined in the next step 18.

The method shown has the advantage that the determination of the liquid, conductive phase can be carried out particularly accurately, as a two-phase flow can be recognized and the influence of the non-conductive phase can be taken into account when determining the flow rate of the liquid phase.

Figure 3:
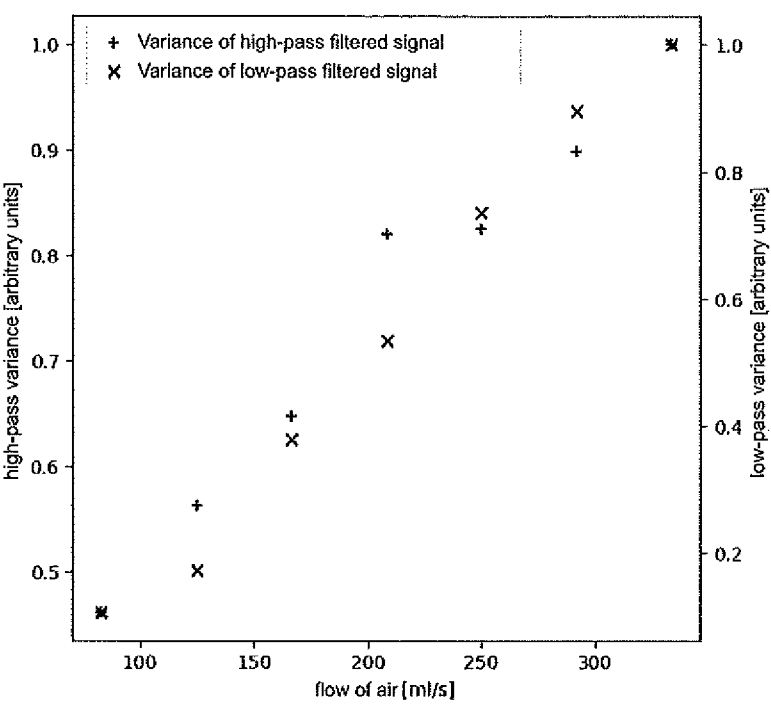
FIG. 3 illustrates the dependence of the high-pass variance and the low-pass variance on the proportion of a gaseous phase in a two-phase flow.

FIG. 3 shows the dependence of the high-pass variance and the low-pass variance on the proportion of the gaseous phase of a two-phase medium at a constant flow rate. For this purpose, the variances are normalized in the embodiment shown. The diagram shows that both the high-pass variance and the low-pass variance increase as the proportion of the gaseous phase increases. This applies to a proportion of gaseous gases of up to approx. 40%. If such a relationship is stored in the control and evaluation unit, the proportion of a gaseous phase of a two-phase flow can be determined based on the determined low-pass variance and/or the determined high-pass variance if the flow velocity is known.

Figure 4:
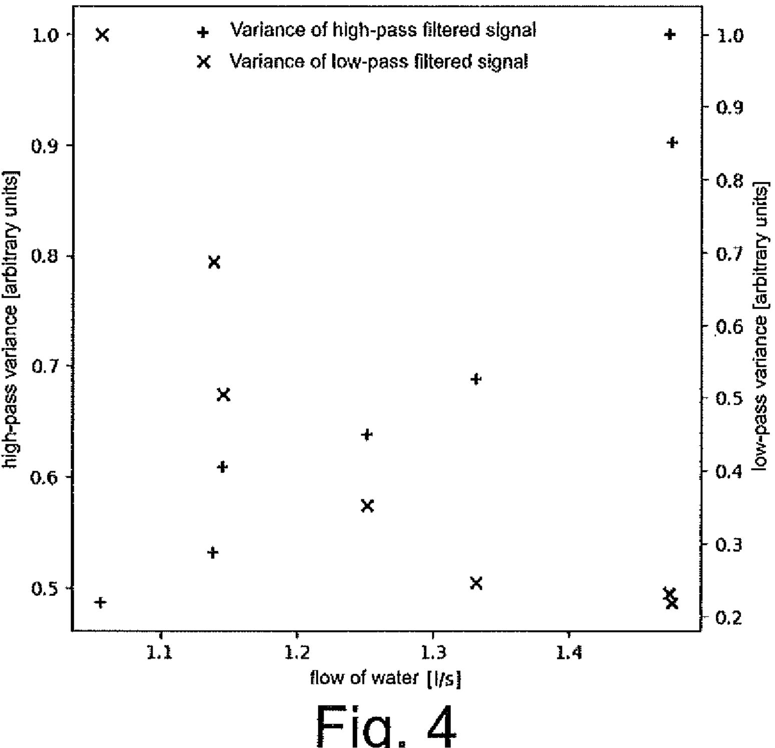
FIG. 4 illustrates the dependence of the high-pass variance and the low-pass variance on the flow velocity of the flowing medium.

FIG. 4 shows the course of the high-pass variance and the course of the low-pass variance for different flow velocities with a constant gaseous component. In the embodiment shown, the variances are normalized. The diagram shows that the high-pass variance increases with increasing flow velocity, while the low-pass variance decreases with increasing flow velocity. Such behavior can also be used as an indicator of two-phase flow.

Figure 5:
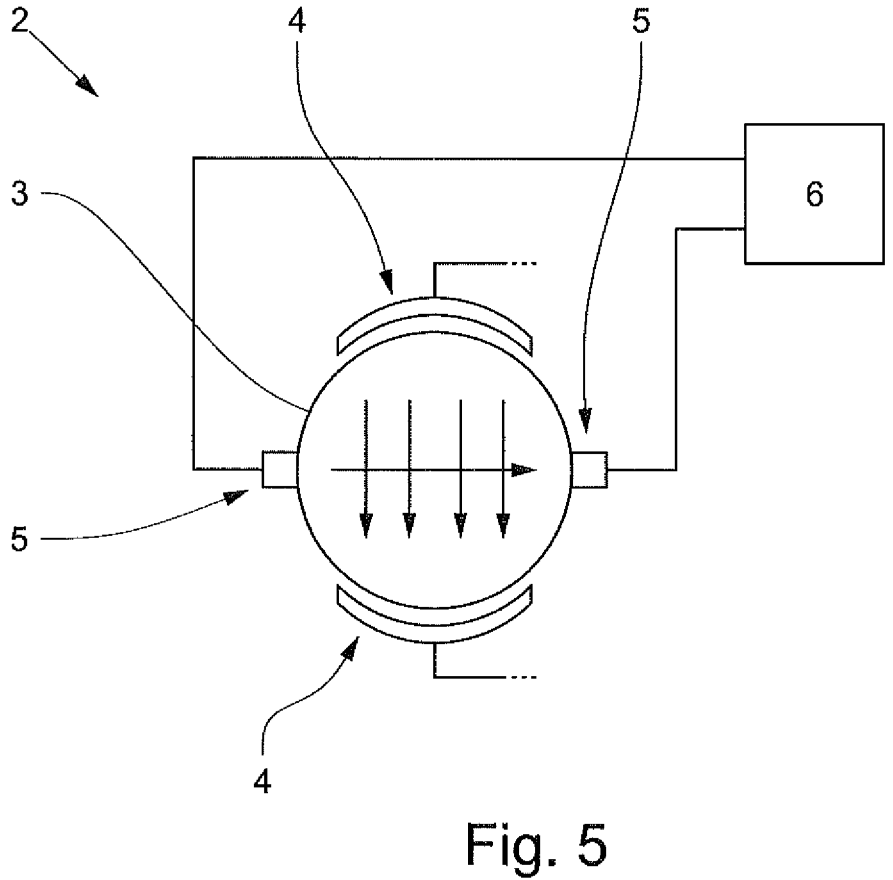
FIG. 5 illustrates an embodiment of a magnetic-inductive flowmeter according to the invention.

FIG. 5 shows a magnetic-inductive flowmeter 2 with a measuring tube 3 for guiding a flowing medium, a magnetic field generating device 4 for generating a magnetic field passing through the measuring tube 3 perpendicular to the direction of flow of the medium, a pair of electrodes 5 for tapping an electrical voltage induced in the medium in the measuring tube 3 and with a control and evaluation unit 6.

The control and evaluation unit 6 is designed in such a way that it performs a method 1 according to the invention for capturing a two-phase flow during operation.

The invention claimed is:

1. A method for operating a magnetic-inductive flowmeter, wherein the magnetic-inductive flowmeter includes at least one measuring tube for guiding a flowing medium, at least one magnetic field generating device for generating a magnetic field passing through the measuring tube perpendicular to the direction of flow of the medium, at least one pair of electrodes for tapping an electrical voltage induced in the medium in the measuring tube, and at least one control and evaluation unit, the method comprising:

recording, using the control and evaluation unit, the electrode signal of the electrode voltage during a magnetic field alignment as measurement data;

filtering the measurement data by a low-pass filter so that a first low-pass filtered evaluation signal is present;

determining a first flow parameter from the low-pass filtered evaluation signal, which is compared with a first limit value stored in the control and evaluation unit;

filtering the measurement data by a high-pass filter so that a high-pass filtered evaluation signal is present;

determining a second flow parameter from the high-pass filtered evaluation signal, which is compared with a second limit value stored in the control and evaluation unit;

separately subjecting the low-pass-filtered evaluation signal and the high-pass-filtered evaluation signal to a same evaluation; and assigning a two-phase flow to the flowing medium if at least one of: (i) the first flow parameter exceeds the first limit value; and (ii) the second flow parameter exceeds the second limit value.

2. The method according to claim 1, wherein the variance of the low-pass filtered evaluation signal is determined as the first flow parameter, so that a low-pass variance is present;

wherein the variance of the high-pass filtered evaluation signal is determined as the second flow parameter, so that a high-pass variance is present;

wherein a low-pass variance limit value and a high-pass variance limit value are stored in the control and evaluation unit;

wherein the low-pass variance is compared with the low-pass variance limit value and that the high-pass variance is compared with the high-pass variance limit value; and wherein a two-phase flow is detected when the low-pass variance exceeds the low-pass variance limit value and/or when the high-pass variance exceeds the high-pass variance limit value.

3. The method according to claim 1, wherein a constant component is subtracted from the low-pass filtered evaluation signal before the comparison with the first limit value; and wherein the constant component is subtracted from the first high-pass-filtered evaluation signal before the comparison with the second limit value.

4. The method according to claim 1, wherein at least one further electrode signal is captured during at least one further magnetic field alignment;

wherein at least one further first flow parameter is determined from the at least one further electrode signal after the low-pass filtering;

wherein at least one further second flow parameter is determined from the at least one further electrode signal after the high-pass filtering;

wherein the first flow parameters are averaged, so that an averaged first flow parameter is present;

wherein the second flow parameters are averaged so that an averaged second flow parameter is present; and wherein the averaged first flow parameter is compared with the first limit value and the averaged second flow parameter is compared with the second limit value to detect a two-phase flow.

5. The method according to claim 1, wherein the cut-off frequency of the low-pass filter is between 50 Hz and 150 Hz.

6. The method according to claim 1, wherein the cut-off frequency of the high-pass filter is between 900 Hz and 1100 Hz.

7. The method according to claim 1, wherein a non-conductive portion of the flowing medium is determined based on at least one of: (i) the first flow parameter or the averaged first flow parameter; and (ii) the second flow parameter or the averaged second flow parameter.

8. The method according to claim 1, wherein a dependence of at least one of the first flow parameter and the second flow parameter on the flow velocity of the medium is stored in the control and evaluation unit; and wherein a presence of a two-phase flow is determined based on at least one of: (i) the course of the first flow parameter or the averaged first flow parameter at different flow velocities of the flowing medium; and (ii) the course of the second flow parameter or the averaged second flow parameter at different flow velocities of the flowing medium.

9. The method according to claim 1, wherein, if a two-phase flow is detected and furthermore the proportion of the non-conductive phase is determined, the volume flow rate of the conductive phase is determined taking into account the non-conductive phase.

10. A magnetic-inductive flowmeter, comprising:

a measuring tube for guiding a flowing medium;

a magnetic field generating device for generating a magnetic field passing through the measuring tube perpendicular to the direction of flow of the medium;

a pair of electrodes for tapping an electrical voltage induced in the medium in the measuring tube; and a control and evaluation unit configured to perform a method including:

recording, using the control and evaluation unit, the electrode signal of the electrode voltage during a magnetic field alignment as measurement data;

filtering the measurement data by a low-pass filter so that a first low-pass filtered evaluation signal is present;

determining a first flow parameter from the low-pass filtered evaluation signal, which is compared with a first limit value stored in the control and evaluation unit;

filtering the measurement data by a high-pass filter so that a high-pass filtered evaluation signal is present;

determining a second flow parameter from the high-pass filtered evaluation signal, which is compared with a second limit value stored in the control and evaluation unit;

separately subjecting the low-pass-filtered evaluation signal and the high-pass-filtered evaluation signal to the same evaluation; and assigning a two-phase flow to the flowing medium if at least one of: (i) the first flow parameter exceeds the first limit value; and (ii) the second flow parameter exceeds the second limit value.

11. The magnetic-inductive flowmeter of claim 10, wherein the variance of the low-pass filtered evaluation signal is determined as the first flow parameter, so that a low-pass variance is present;

wherein the variance of the high-pass filtered evaluation signal is determined as the second flow parameter, so that a high-pass variance is present;

wherein a low-pass variance limit value and a high-pass variance limit value are stored in the control and evaluation unit;

wherein the low-pass variance is compared with the low-pass variance limit value and that the high-pass variance is compared with the high-pass variance limit value; and wherein a two-phase flow is detected when the low-pass variance exceeds the low-pass variance limit value and/or when the high-pass variance exceeds the high-pass variance limit value.

12. The magnetic-inductive flowmeter of claim 10, wherein a constant component is subtracted from the low-pass filtered evaluation signal before the comparison with the first limit value; and wherein the constant component is subtracted from the first high-pass-filtered evaluation signal before the comparison with the second limit value.

13. The magnetic-inductive flowmeter of claim 10, wherein at least one further electrode signal is captured during at least one further magnetic field alignment;

wherein at least one further first flow parameter is determined from the at least one further electrode signal after the low-pass filtering;

wherein at least one further second flow parameter is determined from the at least one further electrode signal after the high-pass filtering;

wherein the first flow parameters are averaged, so that an averaged first flow parameter is present;

wherein the second flow parameters are averaged so that an averaged second flow parameter is present; and wherein the averaged first flow parameter is compared with the first limit value and the averaged second flow parameter is compared with the second limit value to detect a two-phase flow.

14. The magnetic-inductive flowmeter of claim 10, wherein the cut-off frequency of the low-pass filter is between 50 Hz and 150 Hz.

15. The magnetic-inductive flowmeter of claim 10, wherein the cut-off frequency of the high-pass filter is between 900 Hz and 1100 Hz.

16. The magnetic-inductive flowmeter of claim 10, wherein a non-conductive portion of the flowing medium is determined based on at least one of: (i) the first flow parameter or the averaged first flow parameter; and (ii) the second flow parameter or the averaged second flow parameter.

17. The magnetic-inductive flowmeter of claim 10, wherein a dependence of at least one of the first flow parameter and the second flow parameter on the flow velocity of the medium is stored in the control and evaluation unit; and wherein a presence of a two-phase flow is determined based on at least one of: (i) the course of the first flow parameter or the averaged first flow parameter at different flow velocities of the flowing medium; and (ii) the course of the second flow parameter or the averaged second flow parameter at different flow velocities of the flowing medium.

18. The magnetic-inductive flowmeter of claim 10, wherein, if a two-phase flow is detected and furthermore the proportion of the non-conductive phase is determined, the volume flow rate of the conductive phase is determined taking into account the non-conductive phase.

* * * * *